(12) United States Patent
Nishino et al.

(10) Patent No.: US 10,872,268 B2
(45) Date of Patent: Dec. 22, 2020

(54) INFORMATION PROCESSING DEVICE, INFORMATION PROCESSING PROGRAM, AND INFORMATION PROCESSING METHOD

(71) Applicant: DeNA Co., Ltd., Tokyo (JP)

(72) Inventors: Kohei Nishino, Tokyo (JP); Tianqi Li, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 127 days.

(21) Appl. No.: 16/110,970

(22) Filed: Aug. 23, 2018

(65) Prior Publication Data

US 2019/0065900 A1    Feb. 28, 2019

(30) Foreign Application Priority Data

Aug. 23, 2017  (JP) ................... 2017-160377

(51) Int. Cl.
  *G06K 9/62*      (2006.01)
  *G06T 7/90*      (2017.01)
    (Continued)

(52) U.S. Cl.
  CPC ....... *G06K 9/6215* (2013.01); *G06K 9/00362* (2013.01); *G06K 9/00771* (2013.01);
    (Continued)

(58) Field of Classification Search
  CPC combination set(s) only.
  See application file for complete search history.

(56) References Cited

U.S. PATENT DOCUMENTS

2016/0247014 A1*  8/2016  Zheng ............... G06T 7/174
2016/0253554 A1*  9/2016  Tsuji ............... G06K 9/3208
                                                  382/115
(Continued)

FOREIGN PATENT DOCUMENTS

JP    2010-002976 A    1/2010
JP    2012-181710 A    9/2012
JP    2016-157166 A    9/2016

OTHER PUBLICATIONS

Japanese Office Action for related JP Application No. 2017-160377, dated Jan. 30, 2018; English translation provided; 6 pages.
(Continued)

*Primary Examiner* — Helen Zong
(74) *Attorney, Agent, or Firm* — Procopio, Cory, Hargreaves & Savitch LLP (57) ABSTRACT

A body part point detection module detects multiple first body part points associated with a first person image contained in a first image and multiple second body part points associated with second person images contained in a second image. An identicality determination module calculates color differences between the color information of the pixels corresponding to the multiple first body part points of the first person image and the respective color information of the pixels corresponding to the multiple second body part points of the second person images, and uses the calculated color differences to calculate the degree of color similarity between the first person image and second person image and the degree of color similarity between the first person image and second person image. The identicality determination module uses the calculated degrees of color similarity to determine identicality between the first person image and second person images.

5 Claims, 8 Drawing Sheets

(51) Int. Cl.
*G06T 7/73* (2017.01)
*G06K 9/00* (2006.01)
*G06T 7/246* (2017.01)
*G06K 9/46* (2006.01)
*G06T 7/277* (2017.01)

(52) U.S. Cl.
CPC ......... *G06K 9/4652* (2013.01); *G06K 9/6202* (2013.01); *G06T 7/246* (2017.01); *G06T 7/277* (2017.01); *G06T 7/74* (2017.01); *G06T 7/90* (2017.01); *G06T 2207/10016* (2013.01); *G06T 2207/10024* (2013.01); *G06T 2207/20076* (2013.01); *G06T 2207/30196* (2013.01); *G06T 2207/30241* (2013.01)

(56) References Cited

U.S. PATENT DOCUMENTS

2017/0272661 A1* 9/2017 Tsubusaki ................. G01S 3/00
2019/0164575 A1* 5/2019 Bai ...................... G11B 27/031

OTHER PUBLICATIONS

Zheng, L. et al., "Scalable Person Re-identification: A Benchmark," The Fourteenth IEEE International Conference on Computer Vision (ICCV15), Dec. 7-13, 2015, 9 pages.
Cao, Z. et al., "Realtime Multi-Person 2D Pose Estimation using Part Affinity Fields" 2017 IEEE Conference on Computer Vision and Pattern Recognition (CVPR), Apr. 14, 2017, 9 pages.

* cited by examiner

| Body part point | First person image A | Second person image B | Color difference | Degree of similarity |
|---|---|---|---|---|
| Nose | (23, 182, 232) | (11, 112, 222) | 8 | 92% |
| Neck | (32, 172, 182) | (52, 92, 112) | 17 | 63% |
| Left shoulder | ... | ... | ... | ... |
| Left elbow | ... | ... | ... | ... |
| Left hand | ... | ... | ... | ... |
| Right shoulder | ... | ... | ... | ... |
| Right elbow | ... | ... | ... | ... |
| Right hand | ... | ... | ... | ... |
| Left hip | ... | None | 27.5 | 50% |
| Left knee | ... | ... | ... | ... |
| Left foot | ... | ... | ... | ... |
| Right hip | ... | ... | ... | ... |
| Right knee | ... | ... | ... | ... |
| Right foot | ... | ... | ... | ... |
| Left eye | ... | ... | ... | ... |
| Right eye | ... | ... | ... | ... |
| Left ear | ... | ... | ... | ... |
| Right ear | ... | ... | ... | ... |

| Previous frame | Current frame | Degree of color similarity | Positional likelihood | Total likelihood |
|---|---|---|---|---|
| First person image A | Second person image B | 78% | 0.33 | 0.2574 |
| | Second person image C | 88% | 0.01 | 0.0088 |

INFORMATION PROCESSING DEVICE, INFORMATION PROCESSING PROGRAM, AND INFORMATION PROCESSING METHOD

This application claims foreign priority under 35 USC 119 based on Japanese Patent Application No. 2017-160377, filed on Aug. 23, 2017, the contents of which is incorporated herein in its entirety by reference.

BACKGROUND

1. Field

The present invention relates to an information processing device, an information processing program (e.g., non-transitory computer-readable medium including instructions to be performed on a processor), and an information processing method.

2. Related Art

There may be a need to determine identicality (e.g., the quality of being identical) between person images (e.g., persona or identity) contained in one image and person images contained in another image (i.e., whether or not two person images correspond to the same person) for a variety of purposes including security, marketing, and the like.

Techniques that determine identicality between person images have been proposed in the past in response to such needs. For example, Non-Patent Document 1 has disclosed a technique in which sections containing person images are cut out from images, the cut-out images are split into several regions, color histograms are obtained for each region, and identicality between the person images is determined based on comparing pairs of histograms for each region corresponding to each person image in the two images.

On the other hand, Non-Patent Document 2 has disclosed a technique called OpenPose which, while not being a technique for determining identicality between person images, is used to detect the poses (orientation) of person images in an image. In OpenPose, the pose (orientation) of each person image is detected after detecting multiple body part points (18 locations or anatomical points: the nose, neck, left shoulder, left elbow, left hand, right shoulder, right elbow, right hand, left hip, left knee, right knee, left foot, right hip, right foot, left eye, right eye, left ear, and right ear) of one or more person images contained in an image and, in addition, identifying the relationships of each body part point corresponding to each person image.

PRIOR-ART DOCUMENTS

Non-Patent Documents

[Non-Patent Document 1]
Liang Zheng, Liyue Shen, Lu Tian, Shengjin Wang, Jingdong Wang, Qi Tian, "Scalable Person Re-identification: A Benchmark," The Fourteenth IEEE International Conference on Computer Vision (ICCV15).

[Non-Patent Document 2]
Zhe Cao, Tomas Simon, Shih-En Wei, Yaser Sheikh, "Realtime Multi-Person 2D Pose Estimation using Part Affinity Fields," arXiv: 1611.08050v2.

SUMMARY

Problems to be Solved by the Invention

Identicality determination based on color histograms produced for each region, as described, for example, in Non-Patent Document 1, considers even the background color of the person images and, therefore, has room for improvement in terms of identicality determination accuracy. On the other hand, Non-Patent Document 2 describes performing detection of each person's pose in each image, but does not mention determining identicality between person images contained in one image and person images contained in another image.

It is an object of the present invention to determine identicality between person images contained in one image and person images contained in another image in a more efficient and accurate manner.

Means for Solving the Problems

Effects of the Invention

The present invention is an information processing device provided with a body part point detection module that detects multiple first body part points associated with a first person image contained in a first image and multiple second body part points associated with a second person image contained in a second image, and an identicality determination module that determines identicality between the first person image and second person image by comparing the color information of the pixels corresponding to the multiple first body part points in the first image and the color information of the pixels corresponding to the multiple second body part points in the second image.

Preferably, the first image and second image are images selected from multiple captured images captured at different moments in time in the same field of view, and the information processing device is further provided with a positional likelihood distribution calculation module that uses the position of the first person image in the first image and the position of the person image representing the same person as that of the first person image in a captured image captured prior to the first image in order to calculate the likelihood distribution of the position where the person image representing the same person as that of the first person image resides in the second image captured after the first image, and, furthermore, the identicality determination module uses the position of the second body part points and the likelihood distribution to determine identicality between the first person image and second person image.

Preferably, the positional likelihood distribution calculation module uses the position of the first body part point corresponding to the neck of the first person image in the first image and the position of the body part point corresponding to the neck of the person image representing the same person as that of the first person image in a captured image captured prior to the first image in order to calculate the positional likelihood distribution, and the identicality determination module uses the position of the second body part point among the multiple second body part points that corresponds to the neck of the second person image and the likelihood distribution to determine identicality between the first person image and second person image.

Preferably, the first image and second image are frame images contained in a video taken by the same camera and the body part point detection module and the identicality determination module carry out processing in real time during video playback.

Additionally, the present invention is an information processing program (e.g., non-transitory computer-readable medium including instructions to be performed on a processor) directing a computer to operate as a body part point detection module that detects multiple first body part points associated with a first person image contained in a first image and multiple second body part points associated with a second person image contained in a second image, and as an identicality determination module that determines identicality between the first person image and second person image by comparing the color information of the pixels corresponding to the multiple first body part points in the first image and the color information of the pixels corresponding to the multiple second body part points in the second image.

Additionally, the present invention is an information processing method comprising a body part point detection step, during which a computer detects multiple first body part points associated with a first person image contained in a first image and multiple second body part points associated with a second person image contained in a second image, and an identicality determination step, during which a computer determines identicality between the first person image and second person image by comparing the color information of the pixels corresponding to the multiple first body part points in the first image and the color information of the pixels corresponding to the multiple second body part points in the second image.

In accordance with the present invention, determination of identicality between person images contained in one image and person images contained in another image can be performed in a more efficient and accurate manner.

DETAILED DESCRIPTION

Embodiments of the present invention will be described below.

Figure 1:
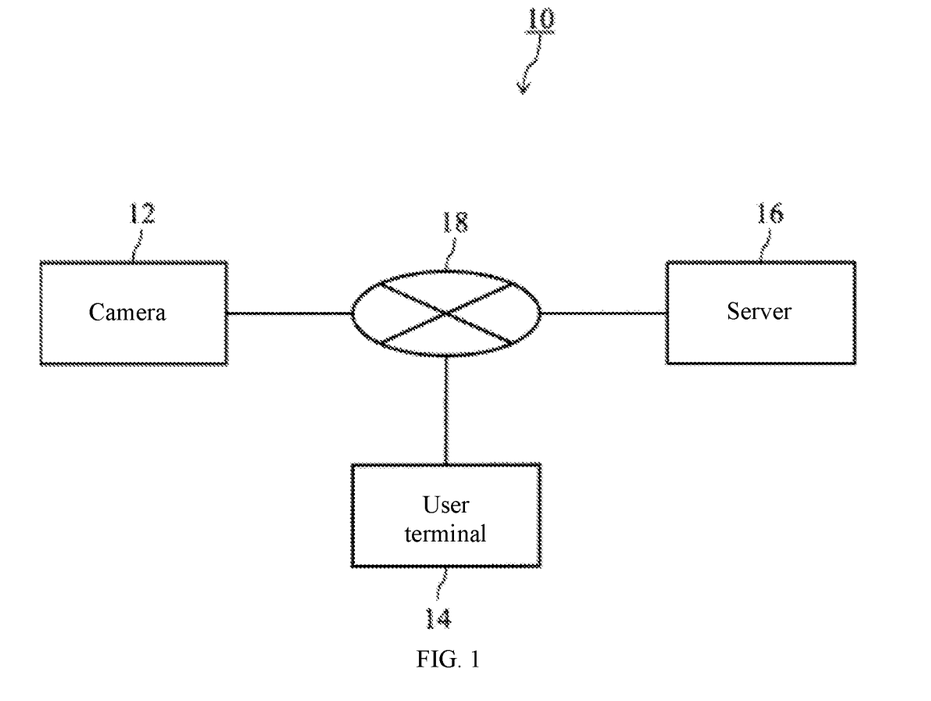
FIG. 1 A schematic diagram of the configuration of an information processing system according to the present embodiment.

A schematic diagram of the configuration of an information processing system 10 according to the present embodiment is illustrated in FIG. 1. The information processing system 10 is configured to include a camera 12, a user terminal 14, and a server 16 operating as an information processing device. The camera 12 and server 16, as well as the user terminal 14 and server 16, are communicatively connected via a telecommunication line 18, such as via a LAN, through the Internet, or the like.

The camera 12 is, for instance, a security camera or a surveillance camera. The camera 12 captures imagery of a street or in-store scene. In the present embodiment, the camera 12 is fixedly mounted to capture images with a constant field of view. In addition, while in the present embodiment the camera 12 is assumed to be a video camera that captures video, it may also take static images in an intermittent manner. The captured images captured by the camera 12 are sent to the server 16 via the telecommunication line 18.

The user terminal 14 is a terminal employed by the user (a person who checks the results of identicality determination processing performed on person images in two images in the server 16). The user terminal 14 may be, for instance, a personal computer, a tablet computer terminal, or the like. The user terminal 14 is configured to include a CPU (Central Processing Unit) or another processor, a hard disk, a ROM (Read-Only Memory), a RAM (Random-Access Memory), or another memory module, a liquid crystal panel or another display module, a mouse, a keyboard, a touchscreen panel, or another input module, a network adapter or another communication module, and the like. By accessing the server 16, the user terminal 14 can receive the results of person image identicality determination processing stored on the server 16.

Figure 2:
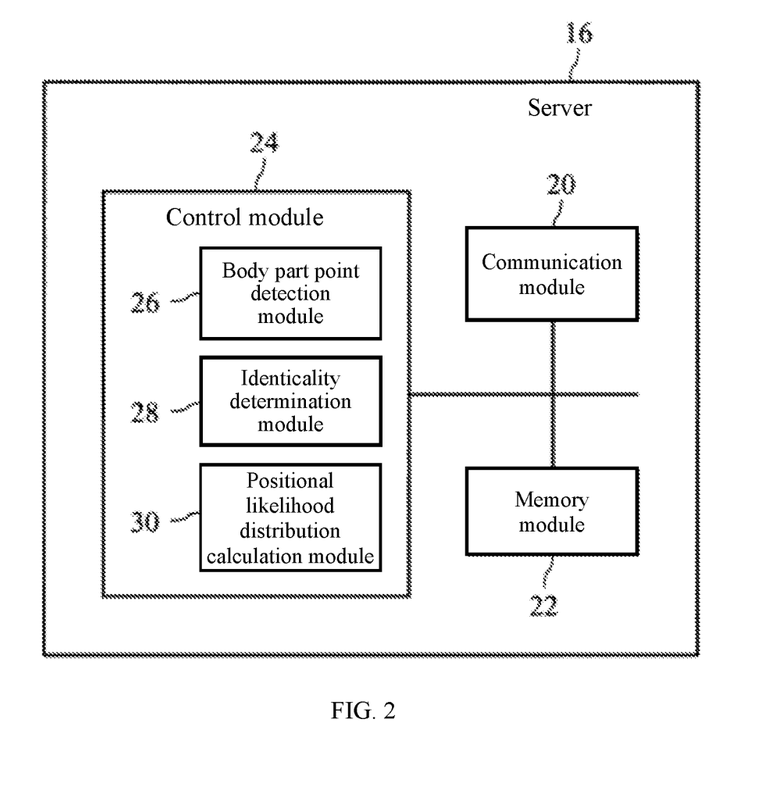
FIG. 2 A schematic diagram of the configuration of a server according to the present embodiment.

A schematic diagram of the configuration of the server 16 is shown in FIG. 2. While in the present embodiment the server 16 is constituted by a computer, as the information processing device, it may be any kind of device so long as it has the functionality shown below.

The communication module 20 is, for example, a network adaptor. The communication module 20 operates to communicate with the camera 12 and user terminal 14 via the telecommunication line 18. Specifically, the communication module 20 receives captured images from the camera 12. In addition, in response to a request from the user terminal 14, the communication module 20 transmits the results of person image identicality determination processing performed by the hereinafter-described control module 24 to the user terminal 14. The information flow mediated by the server 16 is a flow wherein, first, the captured images are sent from the camera 12 to the server 16, and the results obtained by processing said captured images are then sent from the server 16 to the user terminal 14.

The memory module 22 is, for instance, a ROM, a RAM, or a hard disk or the like. Information processing programs (e.g., non-transitory computer-readable medium including instructions to be performed on a processor) intended to actuate each module of the server 16 are stored in the memory module 22. In addition, the captured images sent from the camera 12 are stored in the memory module 22.

The control module 24 is configured to include, for instance, a CPU, a microcontroller, or dedicated ICs for image processing and the like. The control module 24 controls each module of the server 16 according to the information processing programs (e.g., non-transitory computer-readable medium including instructions to be performed on a processor) stored in the memory module 22. In addition, as shown in FIG. 2, the control module 24 operates as a body part point detection module 26, an identicality determination module 28, and a positional likelihood distribution calculation module 30.

Person image identicality determination processing is carried out by the body part point detection module 26, identicality determination module 28, and positional likelihood distribution calculation module 30. In the present embodiment, the control module 24 selects two frame images from the captured images (video images) sent from the camera 12 and stored in the memory module 22. One of the selected frame images is used as a first image and the other frame image is used as a second image. In other words, it can be said that the first and second images are images captured at different moments in time in the same field of view. The body part point detection module 26, identicality determination module 28, and positional likelihood distribution calculation module 30 process said first and second images. It should be noted that the person images are assumed to be contained in the first and second images.

By performing image processing on the first image, the body part point detection module 26 detects multiple first body part points associated with a first person image contained in the first image. The body part point detection module 26 similarly detects multiple second body part points associated with a second person image contained in the second image. If multiple person images are contained in the first or second image, the body part point detection module 26 detects multiple body part points associated with the multiple person images in each image. The OpenPose technique described in Non-Patent Document 2 can be employed as a specific method of detection of multiple body part points in person images. Naturally, techniques other than the OpenPose technique may also be utilized as long as multiple body part points can be detected in the person images.

Figure 3:
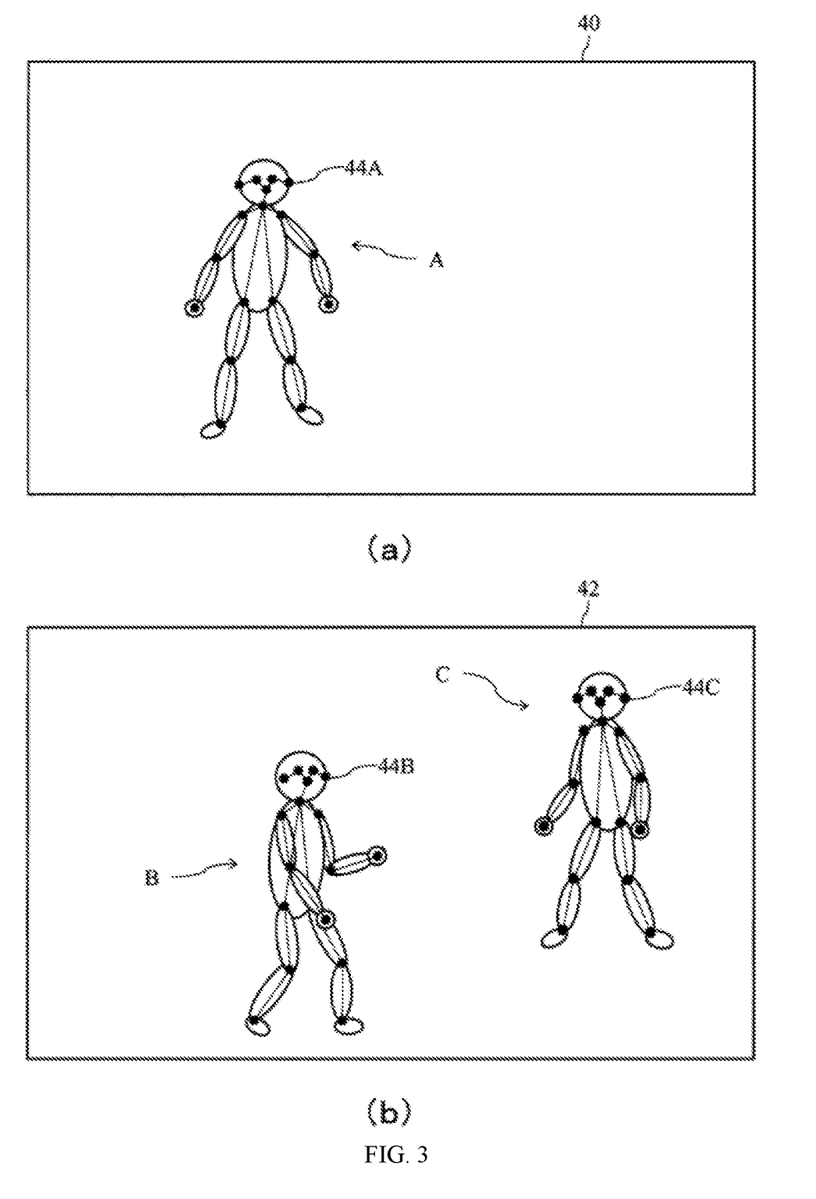
FIG. 3 A conceptual diagram illustrating how the multiple body part points of person images are detected in images.

An example of the first image 40 is illustrated in FIG. 3(*a*) and an example of the second image 42 is illustrated in FIG. 3(*b*). In the present embodiment, it is assumed that a single first person image A is contained in the first image 40 and two second person images B and C are contained in the second image 42.

Referring to FIG. 3(*a*), multiple first body part points 44A associated with the first person image A have been detected in the first image 40. In the present embodiment, the body part point detection module 26 detects 18 locations (i.e., the nose, neck, left shoulder, left elbow, left hand, right shoulder, right elbow, right hand, left hip, left knee, right knee, left foot, right hip, right foot, left eye, right eye, left ear, and right ear) as the body part points of the person images. It should be noted that the body part point detection module 26 detects each body part point after determining the body part of the person image (nose, neck, etc.) to which it corresponds. In addition, in the present embodiment, the body part point detection module 26 detects the position (coordinates) of a single pixel of the first image 40 as the position of each body part point. It should be noted that if multiple first person images are contained in the first image 40, then the body part point detection module 26 detects multiple body part points associated with each first person image.

Referring to FIG. 3(*b*), multiple second body part points 44B associated with the second person image B have been detected in the second image 42 in the same manner as that of the first image 40. In addition, multiple second body part points 44C associated with the second person image C have also been detected.

Referring back to FIG. 2, first, the identicality determination module 28 acquires the color information of each pixel corresponding to the multiple first body part points associated with the first person image A detected by the body part point detection module 26 and the color information of each pixel corresponding to the multiple second body part points associated with second person images B and C. It should be noted that "color information" is a concept that includes hue, lightness (brightness), and chroma.

As mentioned above, the body part point detection module 26 detects the position of each body part point as the position of a single pixel of the first image 40 or second image 42. In the present embodiment, the identicality determination module 28 uses a region with a fixed surface area centered around the single pixel detected by the body part point detection module 26 as the pixels (pixel region) corresponding to each body part point. Specifically, it is assumed that the pixel region corresponding to each body part point has a size of 10 (pixels)×10 (pixels). In addition, the surface area of the pixel region may be varied depending on the dimensions of the person image in the image. For example, the larger the person image in the image is, the larger the surface area of the pixel region may be.

In the present embodiment, the identicality determination module 28 expresses the color of the pixels contained in the pixel regions corresponding to the body part points in the L*a*b* color space and obtains representative values (e.g., the mean, median, and mode values) for the color of the pixels. Subsequently, the obtained representative color values are used as the color information of the pixels (region) of said body part point. It should be noted that the color of each pixel is expressed in the L*a*b* color space because the L*a*b* color space is designed as an approximation of human vision.

It is also noted that feature values other than those described above may be utilized as the color information of the pixels of each body part point. For example, a HOG (Histograms of Oriented Gradients) feature value may be calculated as the color information of the pixel regions corresponding to the body part points. Here, a HOG feature value is a feature value obtained by histogramming the brightness gradient directions of the pixels in the pixel regions.

The color information of the pixels corresponding to each first body part point of the first person image A contained in the first image 40 and the color information of the pixels corresponding to each second body part point of the second person images B and C contained in the second image are acquired as described above.

The identicality determination module 28 then determines identicality between the first person image A and the second person images B and C by comparing the color information of the pixels corresponding to the multiple first body part points of the first person image A and the color information of the pixels corresponding to the multiple second body part points of the second person image B and, in addition, by comparing the color information of the pixels corresponding to the multiple first body part points of the first person image A and the color information of the pixels corresponding to the multiple second body part points of the second person image C.

Figure 4:
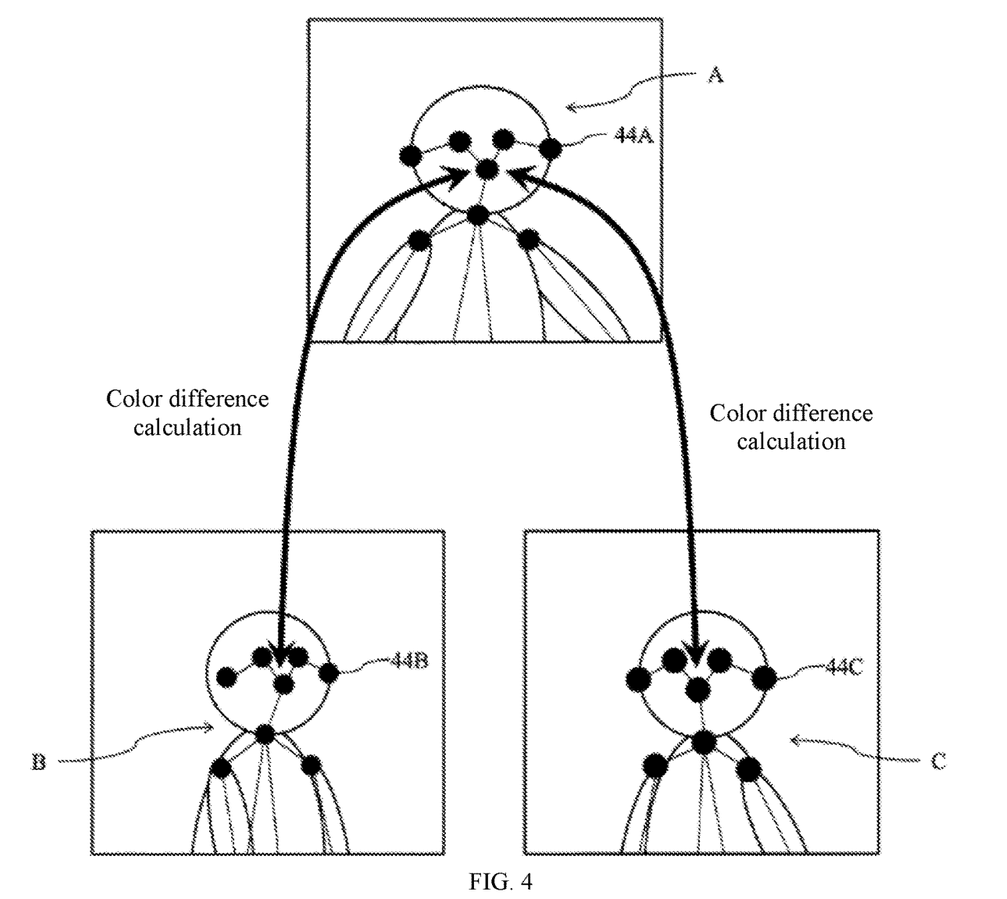
FIG. 4 A conceptual diagram illustrating how the pixel feature values of corresponding pairs of body part points are compared between person images.

Specifically, the module calculates differences (color differences) between the color information of the pixels of the first body part points 44A of the first person image A and the second body part points 44B and 44C of the second person images B and C in the corresponding locations. FIG. 4 shows an enlarged view of the facial portion of the first person image A in the first image 40, an enlarged view of the facial portion of the second person image B in the second image 42, and an enlarged view of the facial portion of the second person image C in the second image 42. As shown in FIG. 4, a color difference is calculated, for example, between the color information of the pixels corresponding to the nose of the first person image A and the color information of the pixels corresponding to the nose of the second person image B, and the color differences are similarly calculated for other body parts (body part points). In the same manner, a color difference is calculated between the color information of the pixels corresponding to the nose of the first person image A and the color information of the pixels corresponding to the nose of the second person image C, and the color differences are similarly calculated for other body parts (body part points).

In the present embodiment, the color differences between the color information values of the pixels of each body part point are calculated using the CIE 2000 color difference formula. This is so because the CIE 2000 color difference formula is a formula that takes into account the hue, lightness, and chroma dependencies characteristic of the color vision range of the human eye. In other words, color differences based on the CIE 2000 color difference formula are close to the color differences perceived by human vision.

Figure 5:
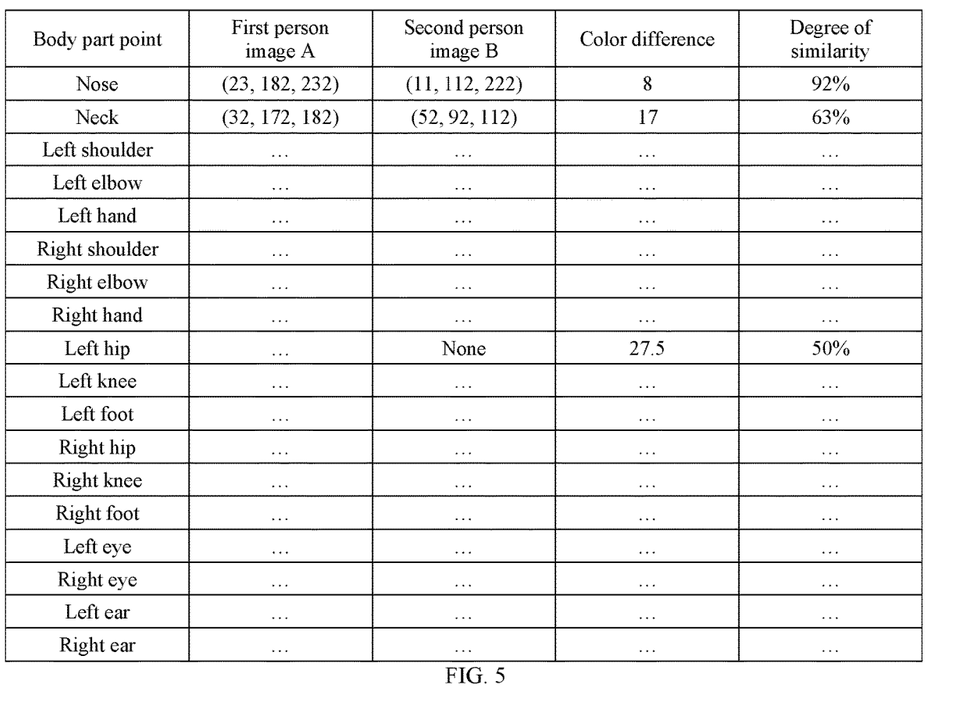
FIG. 5 A diagram illustrating an example of color differences and degrees of similarity between pairs of body part points.

FIG. 5 shows differences (color differences) between the color information of the pixels of each first body part point of the first person image A and the color information of the pixels of each second body part point of the second person image B. As shown in FIG. 5, color differences are calculated for each body part point. The identicality determination module 28 calculates similarity for each body part point based on the calculated color difference. Specifically, the identicality determination module 28 performs calculations such that the smaller the color difference, the greater the degree of similarity. In the present embodiment, the degree of similarity is calculated based on color differences using the following formula.

$$\frac{1}{1+e^{\alpha d - \beta}} \qquad \text{[Formula 1]}$$

Here, "d" is a color difference value, and "α" and "β" are constants. Appropriate configuration of "α" and "β" allows for the degree of similarity to be adjusted relative to the value of color difference.

FIG. 5 shows the degrees of similarity calculated for each body part point. In this manner, multiple degrees of similarity between the first person image A and second person image B are calculated for multiple body part points (18 points in the present embodiment). The identicality determination module 28 obtains representative values (e.g., the mean, median, and mode values) for the calculated multiple degrees of similarity. The thus obtained representative values of similarity reflect the degree of similarity between the first person image A and second person image B. It should be noted that if there are body part points that have not been detected by the body part point detection module 26 among the multiple body part points of the first person image A or second person image B as a result of being cut off or hidden in the first image 40 or second image 42, the degrees of similarity associated with said body part points are set to predetermined values. In the present embodiment, as shown in FIG. 3(*b*) and FIG. 5, no body part points have been detected on the left hip of the second person image B, and, for this reason, the degree of similarity between the first person image A and second person image B for the left hip is set to a predetermined value of 50%.

The identicality determination module 28 calculates the degree of similarity between the first person image A and the second person image C in the same manner. If multiple first person images are contained in the first image 40, the identicality determination module 28 calculates the respective degrees of similarity of each first person image and each second person image.

The identicality determination module 28 determines that, from among the multiple second person images, the second person images having a degree of similarity equal to or lower than a predetermined similarity threshold value are not images of the same person as that of the first person image A. Then, if there remain multiple second person images (if the degree of similarity of multiple second person images exceeds the similarity threshold), it is determined that the second person image with the largest degree of similarity among them is an image of the same person as that of the first person image A. It should be noted that if the degree of similarity of all the second person images is equal to or lower than the similarity threshold, the identicality determination module 28 determines that the second image 42 does not include an image of the same person as that of the first person image A. Further, if the first image 40 includes multiple first person images, the identicality determination module 28 performs the above-described identicality determination processing on each first person image.

It should be noted that subsequent to the identicality determination processing performed by the identicality determination module 28, in response to a request from the user terminal 14, the server 16 transmits the identicality determination results for the first person image A and second person images B and C to the user terminal 14. As a result, the identicality determination results are displayed on the display module of the user terminal 14 and the user can check the identicality determination results.

The identicality between the first person image and second person images of the first image 40 and second image 42 is determined as described above. The same person can be tracked across video images by performing the above-described processing on each pair of adjacent frame images contained in the video captured by the video camera 12.

In the present embodiment, upon detection of each body part point of the first person image and each body part point of the second person images, each detected body part point is used as a point of comparison between the pixels of two person images. Calculating the degree of similarity of the corresponding body part points not only improves the accuracy of calculation of the degree of similarity between person images, but also reduces the computational load required to calculate the degree of similarity in comparison with cases where entire person images are compared. In other words, identicality between two person images can be determined in a more efficient manner.

Further, in accordance with the present embodiment, it can be favorably determined that the two person images are images of the same person even if the position of the first person image in the first image 40 is distanced from the position of the second person image in the second image 42 that represents the same person as that of said first person image. Accordingly, even if the frame rate of the video is low (e.g., even on the order of 2 FPS (frames per second)), it is still possible to favorably determine (in other words, track) identicality between two person images. In this respect, the present embodiment is superior to conventional tracking techniques that require the frame rate of the video to be high (e.g., particle filters, etc.). In this manner, since in the present embodiment a high frame rate is not required for identicality determination (in other words, the second image 42 may be a frame image arriving about 0.5 seconds after the first image 40), even though a single identicality determination process requires a certain amount of time, it is still possible to determine identicality between the first person image and second person images in real time during video playback.

If the first image 40 and second image 42 are images selected from multiple captured images captured at different moments in time in the same field of view (e.g., if the first image 40 and second image 42 are frame images contained in a video captured by the video camera 12), the identicality determination module 28 can determine identicality between two person images in a more accurate manner by additionally considering the calculation results obtained by the positional likelihood distribution calculation module 30.

The positional likelihood distribution calculation module 30 uses the position of the first person image A in the first image 40 and the position of the person image representing the same person as that of the first person image A in one or more captured images captured prior to the first image 40 in order to calculate the likelihood distribution of the position where the person image representing the same person as that of the first person image A resides in the second image 42 captured after the first image 40.

The invention will now be described in detail with reference to FIG. 6. FIG. 6(a) shows the same first image 40 as the one in FIG. 3. Furthermore, FIG. 6(a) shows the position of person image A', which represents the same person as that of the first person image A, in the frame image A' immediately preceding the first image 40, as well as the position of person image A", which represents the same person as that of the first person image A, in the frame image A" which is two frames prior to the first image 40. It should be noted that the identicality of person image A" in frame image A", person image A' in frame image A', as well as the first person image A in the first image 40 is determined by the above-described processing performed by the identicality determination module 28.

Figure 6:
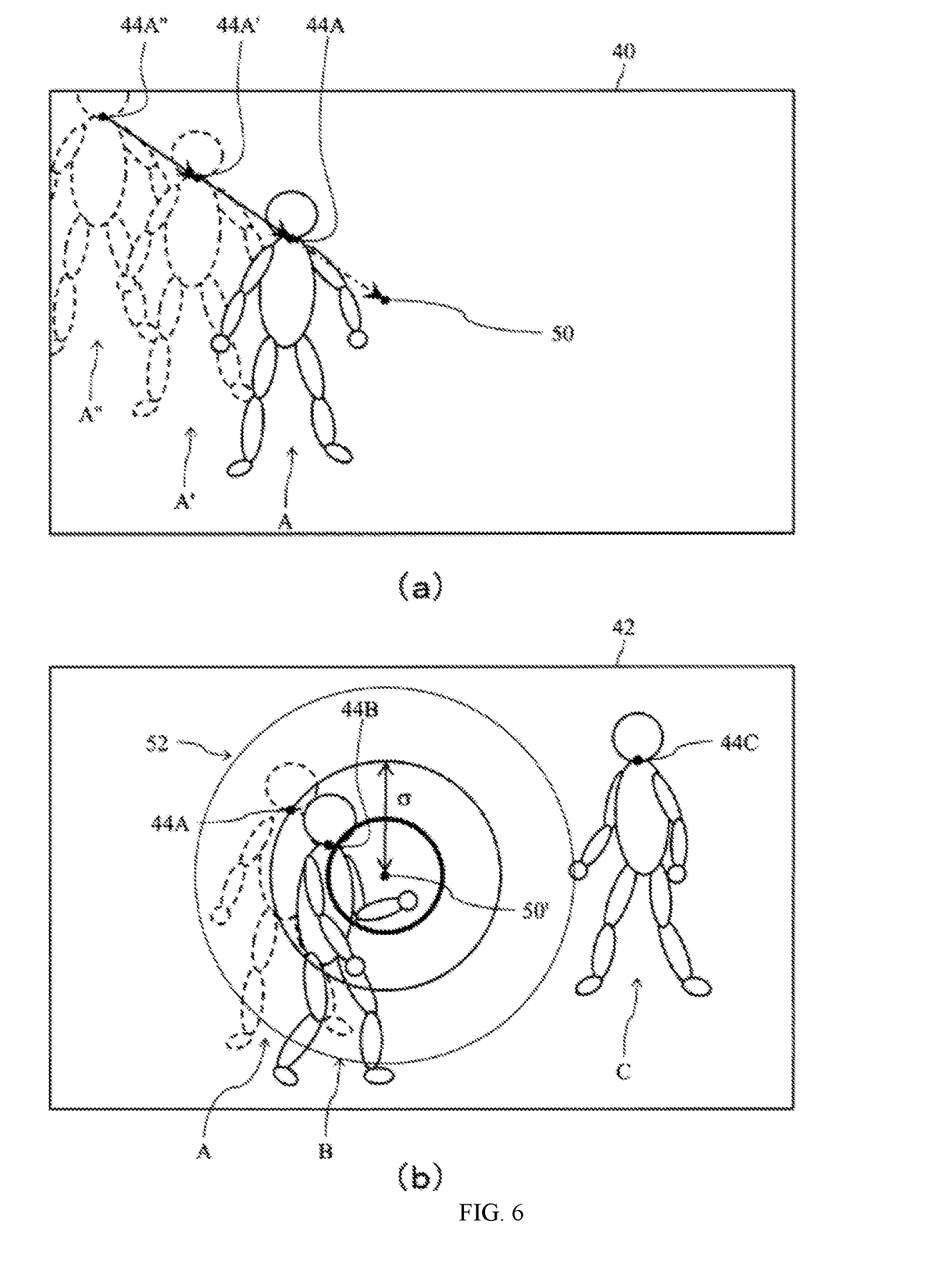
FIG. 6 A conceptual diagram illustrating the positional likelihood distribution of the first person image A.

In the present embodiment, as shown in FIG. 6(a), the position of the body part point 44A" corresponding to the neck of person image A" is used as the position of person image A", the body part point 44A' corresponding to the neck of person image A' is used as the position of person image A', and the position of the first body part point 44A corresponding to the neck of the first person image A is used as the position of the first person image A. This is due to the fact that, among the multiple body part points, the body part point corresponding to the neck exhibits the least amount of positional variation due to the orientation of the person image.

In the present embodiment, depending on the variation of the positions of person image A", person image A', and the first person image A over time, the positional likelihood distribution calculation module 30 calculates a predicted position 50 where the (position of the neck of the) person image representing the same person as that of the first person image A resides in the second image 42, i.e., the frame image that follows the first image 40. The predicted position 50 can be calculated using well-known techniques.

The positional likelihood distribution calculation module 30 then plots a predicted position 50' in the second image 42 in the same position as the predicted position 50 in the first image 40, and the predicted position 50' is used as a center for a 2-dimensional normal distribution. Said 2-dimensional normal distribution is the likelihood distribution 52 of the position where the person image representing the same person as that of the first person image A resides. In other words, the positional likelihood distribution 52 is such that the likelihood of the position becomes highest in the predicted position 50' and becomes smaller with increasing distance from the predicted position 50'. It should be noted that in the present embodiment, as shown in FIG. 6(b), in the positional likelihood distribution 52, the distance from the predicted position 50' to the position corresponding to the position of the first body part point 44A (i.e., the neck of the first person image A in the first image 40) is configured to be within σ in the normal distribution. In addition, the value of positional likelihood in the predicted position 50' may be configured as appropriate. In the present embodiment, positional likelihood takes a value of between 0 and 1, and the value of positional likelihood in the predicted position 50' is assumed to be 1.

The identicality determination module 28 calculates not only the degree of similarity of color information between the first person image A and second person image B, but also uses the positional likelihood of the second person image B to calculate total likelihood, which is an index showing that the first person image A and second person image B are the same person.

First, the positional likelihood of the second person image B is calculated from the positional likelihood distribution 52 and the position of the second person image B. In the present embodiment, the positional likelihood of the second person image B is calculated based on the positional likelihood distribution 52 and the position of the second body part point 44B corresponding to the neck of the second person image B. Referring to FIG. 6(b), the calculated positional likelihood of the second person image B increases as the position of the second body part point 44B corresponding to the neck of the second person image B approaches the predicted position 50'. In other words, it is determined that, as the position of the second body part point 44B corresponding to the neck of the second person image B approaches the predicted position 50', the likelihood that the second person image B represents the same person as that of the first person image A increases.

The identicality determination module 28 then uses the degree of similarity of color information between the first person image A and second person image B calculated in the above-described process and the calculated positional likelihood of the second person image B to calculate total likelihood for the first person image A and second person image B. In the present embodiment, total likelihood is calculated by multiplying the degree of similarity of color information between the first person image A and second person image B by the calculated positional likelihood of the second person image B.

Figure 7:
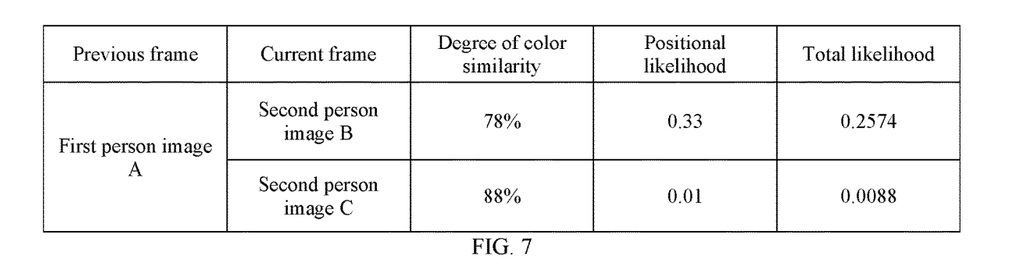
FIG. 7 A diagram illustrating the color similarity, positional likelihood, and total likelihood for the second person image B and the second person image C with respect to the first person image A.

The identicality determination module 28 calculates total likelihood for the first person image A and second person image C in the same manner. FIG. 7 shows the calculated total likelihoods.

The identicality determination module 28 determines that, from among the total likelihood values calculated for multiple second person images, the second person images having total likelihood values equal to or lower than a predetermined total likelihood threshold are not images of the same person as that of the first person image A. Then, if there remain multiple second person images (if the total likelihood of multiple second person images exceeds the total likelihood threshold), it is determined that the second person image with the largest total likelihood among them is an image of the same person as that of the first person image A. It should be noted that if the total likelihood of all the second person images is equal to or lower than the total likelihood threshold, the identicality determination module 28 again determines that the second image 42 does not include an image of the same person as that of the first person image A.

Determining identicality by considering the positional likelihood of each of the second person images makes it possible to improve the accuracy of identicality determination. For example, consider a case in which the first person image A and second person image B represent the same person. As shown in FIG. 7, in some cases, due to certain factors, the calculated degree of similarity of color information between the first person image A and second person image C is greater than the degree of similarity of color information between the first person image A and second person image B. In such a case, as shown in FIG. 6(b), the position of the second person image B is relatively close to the predicted position 50', which causes a relatively high positional likelihood value of 0.33 to be calculated (see FIG. 7) and, at the same time, the position of the second person image C is relatively far from the predicted position 50', thereby causing a relatively low positional likelihood value of 0.01 to be calculated (see FIG. 7). Therefore, in terms of total likelihood, the total likelihood for the first person image A and second person image B becomes higher than the total likelihood for the first person image A and second person image C, as a result of which it becomes possible to correctly determine that the second person image B represents the same person as that of the first person image A.

Figure 8:
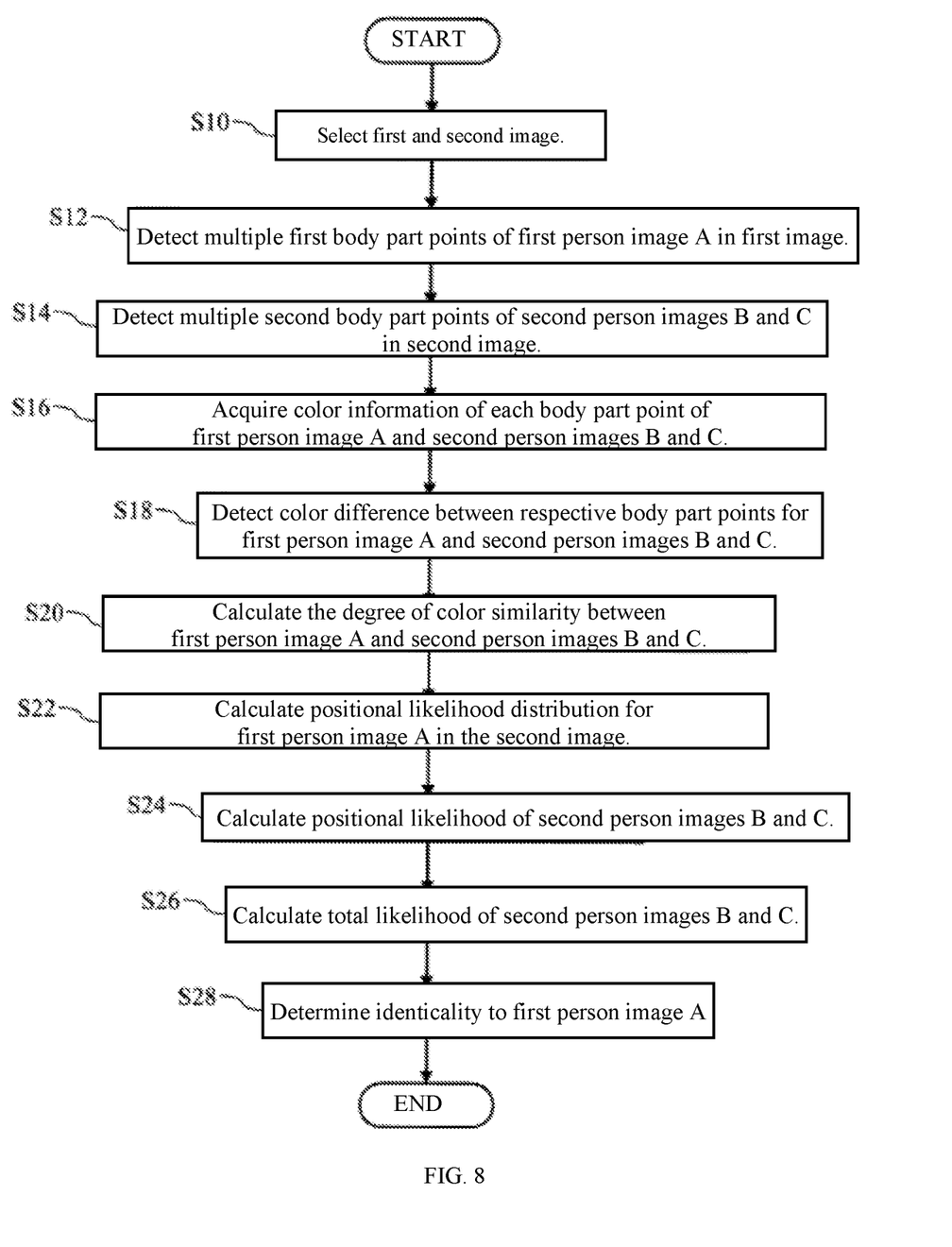
FIG. 8 A flow chart illustrating the processing workflow of the server according to the present embodiment.

The processing workflow of the server 16 according to the present embodiment will be discussed below with reference to the flow chart shown in FIG. 8.

First, in Step S10, the control module 24 selects the first image 40 and second image 42 from the multiple images captured by the camera 12 and stored in the memory module 22. In this example, two frames are selected from the video captured by the video camera 12, and two images such as the ones illustrated in FIG. 3 are used as the first image 40 and second image 42.

In Step S12, the body part point detection module 26 detects multiple first body part points associated with the first person image A contained in the first image 40.

In Step S14, the body part point detection module 26 detects multiple second body part points associated with the second person image B contained in the second image 42. Steps S12 and S14 correspond to body part point detection steps.

In Step S16, the identicality determination module 28 acquires the color information of the pixels respectively corresponding to the multiple body part points associated with the first person image A detected in Step S12 and to the multiple body part points associated with the second person images B and C detected in Step S14.

In Step S18, the identicality determination module 28 calculates color differences between the color information of the pixels corresponding to the multiple first body part points of the first person image A and the color information of the pixels corresponding to the multiple second body part points of the second person image B, and, in addition, color differences between the color information of the pixels corresponding to the multiple first body part points of the first person image A and the color information of the pixels corresponding to the multiple second body part points of the second person image C.

In Step S20, the identicality determination module 28 uses the color differences for each body part point calculated in Step S18 to calculate the degree of color similarity between the first person image A and second person image B and the degree of color similarity between the first person image A and second person image C.

In Step S22, the positional likelihood distribution calculation module 30 uses the first image 40 and one or more immediately preceding frame images to calculate the likelihood distribution of the position where the person image representing the same person as that of the first person image A resides in the second image 42.

In Step S24, the identicality determination module 28 uses the positional likelihood distribution calculated in Step S22 and the position of the second person images B and C in the second image 42 to calculate the positional likelihood of the second person images B and C.

In Step S26, the identicality determination module 28 uses the degree of color similarity calculated in Step S20 and the positional likelihood calculated in Step S24 to calculate total likelihood for the first person image A and second person image B and total likelihood for the first person image A and second person image C.

In Step S28, the identicality determination module 28 uses the total likelihood calculated in Step S26 to determine identicality between the first person image A and second person images B and C. Step S28 corresponds to an identicality determination step.

Although an embodiment of the present invention has been described above, the present invention is not limited to the above-described embodiment and allows for various modifications as long as they do not deviate from the gist of the present invention.

DESCRIPTION OF THE REFERENCE NUMERALS

10 Information processing system
12 Camera
14 User terminal
16 Server
18 Telecommunication line
20 Communication module
22 Memory module
24 Control module
26 Body part point detection module
28 Identicality determination module
30 Positional likelihood distribution calculation module

The invention claimed is:

1. An information processing device comprising:
   at least one hardware processor; and
   one or more software modules that are configured to, when executed by the at least one hardware processor, during playback of a video comprising a plurality of image frames,
      detect multiple first body part points, wherein each first body part point is associated with a body part in a first person image contained in a first one of the plurality of image frames, and wherein at least one first body part point is on a neck in the first person image,
      detect multiple second body part points, wherein each second body part point is associated with a body part in a second person image contained in a second one of the plurality of image frames, and
      determine identicality between the first person image and second person image by
         for each of the multiple first body part points, comparing color information of pixels corresponding to the first body part point to color information of pixels of a corresponding one of the multiple second body part points to determine a color similarity value, for at least one of the multiple first body part points, compare a position of the at least one first body part point to a position of the corresponding one of the multiple second body part points to determine a positional likelihood value, generate a total likelihood value based on the color similarity values and the positional likelihood value, and determine whether or not the first person image and the second person image represent a same person based on the total likelihood value.

2. The information processing device of claim 1, wherein the color information is expressed in an L*a*b* color space.

3. The information processing device of claim 2, wherein the comparison comprises:

calculating a difference d between the color information of pixels corresponding to the first body part point and the color information of pixels of the corresponding one of the multiple second body part points, and calculating a degree of similarity, based on the calculated difference d, using $$\frac{1}{1+e^{\alpha d-\beta}}$$

wherein $\alpha$ and $\beta$ are constants.

4. A non-transitory computer-readable medium including instructions to be performed on a processor, for directing a computer to, during playback of a video comprising a plurality of image frames:

detect multiple first body part points, wherein each first body part point is associated with a body part in a first person image contained in a first one of the plurality of image frames, and wherein at least one first body part point is on a neck in the first person image;

detect multiple second body part points, wherein each second body part point is associated with a body part in a second person image contained in a second one of the plurality of image frames; and determine identicality between the first person image and second person image by for each of the multiple first body part points, comparing color information of pixels corresponding to the first body part point to color information of pixels of a corresponding one of the multiple second body part points to determine a color similarity value, for at least one of the multiple first body part points, compare a position of the at least one first body part point to a position of the corresponding one of the multiple second body part points to determine a positional likelihood value, generate a total likelihood value based on the color similarity values and the positional likelihood value, and determine whether or not the first person image and the second person image represent a same person based on the total likelihood value.

5. A computer-implemented information processing method, comprising, during playback of a video comprising a plurality of image frames:

detecting multiple first body part points, wherein each first body part point is associated with a body part in a first person image contained in a first one of the plurality of image frames, and wherein at least one first body part point is on a neck in the first person image;

detecting multiple second body part points, wherein each second body part point is associated with a body part in a second person image contained in a second one of the plurality of image frames; and determining identicality between the first person image and second person image by for each of the multiple first body part points, comparing color information of pixels corresponding to the first body part point to color information of pixels of a corresponding one of the multiple second body part points to determine a color similarity value, for at least one of the multiple first body part points, compare a position of the at least one first body part point to a position of the corresponding one of the multiple second body part points to determine a positional likelihood value, generate a total likelihood value based on the color similarity values and the positional likelihood value, and determine whether or not the first person image and the second person image represent a same person based on the total likelihood value.

* * * * *